United States Patent
Ramani et al.

(10) Patent No.: US 12,373,794 B2
(45) Date of Patent: Jul. 29, 2025

(54) METHOD AND SYSTEM FOR RESUME DATA EXTRACTION

(71) Applicant: JPMorgan Chase Bank, N.A., New York, NY (US)

(72) Inventors: Keshav Ramani, Jersey City, NJ (US); Salwa Husam Alamir, Bournemouth (GB); Armineh Nourbakhsh, Pittsburgh, PA (US); Daniel Borrajo, Pozuelo de Alarcon (ES); Sameena Shah, Scarsdale, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 252 days.

(21) Appl. No.: 17/596,041

(22) PCT Filed: Dec. 10, 2020

(86) PCT No.: PCT/US2020/064264
§ 371 (c)(1),
(2) Date: Dec. 2, 2021

(87) PCT Pub. No.: WO2022/125096
PCT Pub. Date: Jun. 16, 2022

(65) Prior Publication Data
US 2022/0327488 A1 Oct. 13, 2022

(51) Int. Cl.
*G06Q 10/1053* (2023.01)
(52) U.S. Cl.
CPC .............. *G06Q 10/1053* (2013.01)

(58) Field of Classification Search
CPC .................................. G06Q 10/1053
See application file for complete search history.

(56) References Cited

U.S. PATENT DOCUMENTS

| | | | |
|---|---|---|---|
| 7,711,573 B1 * | 5/2010 | Obeid | G06Q 10/105 705/321 |
| 2004/0102982 A1 | 5/2004 | Reid et al. | |
| 2009/0204470 A1 | 8/2009 | Weyl et al. | |
| 2011/0313963 A1 | 12/2011 | Liu et al. | |

(Continued)

OTHER PUBLICATIONS

Nimbekar, Rohini, et al. "Automated resume evaluation system using NLP." 2019 International Conference on Advances in Computing, Communication and Control (ICAC3). IEEE, 2019. (Year: 2019).*

(Continued)

*Primary Examiner* — Brendan S O'Shea
(74) *Attorney, Agent, or Firm* — Greenblum & Bernstein, P.L.C.

(57) ABSTRACT

Systems and methods for extracting information from a resume of an applicant are provided. The method includes: receiving a resume that relates to an applicant; extracting information that relates to applicant attributes from the resume; comparing the extracted information with a predetermined list of job-specific skills and with a predetermined list of characteristics that relate to soft skills; using the extracted information to determine applicant achievements; and determining at least one skill that corresponds to the applicant. The method may be implemented by using a deep learning technique and/or a natural language processing technique.

14 Claims, 6 Drawing Sheets

(56) References Cited

U.S. PATENT DOCUMENTS

| | | | |
|---|---|---|---|
| 2013/0097664 A1 | 4/2013 | Herz et al. | |
| 2014/0122355 A1 | 5/2014 | Hardtke et al. | |
| 2015/0317610 A1* | 11/2015 | Rao | G06Q 10/10 |
| | | | 705/321 |
| 2016/0350425 A1* | 12/2016 | Tripathi | G06Q 10/1053 |
| 2018/0089627 A1* | 3/2018 | Liss | G06F 16/951 |
| 2018/0314756 A1* | 11/2018 | Wang | G06F 16/334 |
| 2020/0293974 A1* | 9/2020 | Kaura | G06Q 10/1053 |
| 2020/0410053 A1* | 12/2020 | Zhang | G06N 3/02 |
| 2021/0326747 A1* | 10/2021 | Shi | G06N 5/04 |

OTHER PUBLICATIONS

Viktor "SentenceBERT—Semantically meaningful sentence embeddings the right way" Medium, Mar. 4, 2020; available at: https://medium.com/dair-ai/tl-dr-sentencebert-8dec326daf4e (Year: 2020).*

Kulshrestha, Ria "NLP 101: Word2Vec—Skip-gram and CBOW" Medium, Nov. 24, 2019; available at: https://towardsdatascience.com/nlp-101-word2vec-skip-gram-and-cbow-93512ee24314 (Year: 2019).*

Sayfullina, Luiza, Eric Malmi, and Juho Kannala. "Learning representations for soft skill matching." Analysis of Images, Social Networks and Texts: 7th International Conference, AIST 2018, Moscow, Russia, Jul. 5-7, 2018, Revised Selected Papers 7. Springer International Publishing, 2018. (Year: 2018).*

Bian, Shuqing, et al. "Learning to match jobs with resumes from sparse interaction data using multi-view co-teaching network." Proceedings of the 29th ACM International Conference on Information & Knowledge Management. 2020. (Year: 2020).*

International Search Report and Written Opinion in corresponding International Patent Application No. PCT/US20/64264, dated Mar. 2, 2021.

* cited by examiner

METHOD AND SYSTEM FOR RESUME DATA EXTRACTION

BACKGROUND

1. Field of the Disclosure

This technology generally relates to methods and systems for processing resumes, and more particularly, to methods and systems for extracting information from a resume of an applicant by using deep learning and natural language processing techniques.

2. Background Information

Many organizations seek to hire individuals to be employed in various positions. Likewise, many persons apply for employment with such organizations. Typically, each such person provides a resume that includes relevant information with respect to the person's suitability for employment within the organization.

For a large organization, the number of available positions for employment may be relatively large, and the number of applicants may be substantially larger. For each such applicant, there is a need to extract information that relates to skills and achievements. However, this may be a time-consuming task, especially if being performed manually by any particular person or group.

In a large commercial enterprise, millions of applications may be received for job postings. The filtration of resumes included in these applications is a highly manual process; and the goal of finding a suitable application is akin to finding a needle in a haystack. This problem is compounded by the fact that resumes are highly cumbersome documents, often overloaded with information concerning the candidate. These documents are scrutinized from various angles, and this is a subjective task that requires a relatively large amount of human resources.

From the above discussion, it may seem fairly obvious that any impact made to automate this highly manual effort would be greatly impactful. However, as is the case with most ambitious artificial intelligence (AI) tasks, this has its own native challenges: 1) Approximately one in six resumes makes it past a preliminary filter. Various job specific or subjective factors factor into deciding who makes it into this cohort. 2) Resumes can be of various styles and lengths, thereby posing significant automation challenges. 3) Most importantly, there is no gold standard template for the structure or contents in a resume. Sense making from these visually and linguistically personalized documents is a significant challenge. 4) There is no unified evaluation for candidates. Each job role looks for a certain set of skills—some soft, some being job-specific or technical skills, etc. 5) Candidates are prone to add verbiage to their resumes in order to increase the volume of their achievements, thereby requiring a non-trivial process to extract meaningful facets of candidature.

The aforementioned challenges make it clear that this is by no means a task that merely requires a machine to efficiently execute a set of tasks alone. The machine requires non-trivial processing to perform various levels of human-like intelligent tasks such as filtering excess verbiage, understanding context, and interpreting and condensing a resume to key points of candidature.

Accordingly, there is a need for a methodology for extracting information from a resume of an applicant by using deep learning and natural language processing techniques.

SUMMARY

The present disclosure, through one or more of its various aspects, embodiments, and/or specific features or sub-components, provides, inter alia, various systems, servers, devices, methods, media, programs, and platforms for extracting information from a resume of an applicant by using deep learning and natural language processing techniques.

According to an aspect of the present disclosure, a method for extracting information from a resume of an applicant is provided. The method is implemented by at least one processor. The method includes: receiving, by the at least one processor, a first resume that relates to a first applicant; extracting, by the at least one processor from the received first resume, first information that relates to at least one applicant attribute; comparing, by the at least one processor, the extracted first information with a predetermined plurality of skills; and determining, by the at least one processor based on a result of the comparing, at least one skill that corresponds to the first applicant.

The method may further include annotating the first resume based on a result of the determining.

The comparing may include comparing the extracted first information with a predetermined plurality of job-specific skills and comparing the extracted first information with a predetermined corpus of applicant characteristics that relate to soft skills.

The comparing of the extracted first information with the predetermined corpus of applicant characteristics may include using a Bidirectional Encoder Representations from Transformers (BERT) model to compare the extracted first information with the predetermined corpus of applicant characteristics. The determining of the at least one skill that corresponds to the first applicant may include using a 0.75 cosine similarity threshold with respect to a result of the using of the BERT model.

The method may further include determining the predetermined plurality of job-specific skills by applying a term frequency/inverse document frequency (TF/IDF) technique to a plurality of previously received resumes.

The method may further include using the extracted first information to determine at least one achievement that relates to the first applicant.

The using of the extracted first information to determine at least one achievement that relates to the first applicant may include performing a part-of-speech (POS) tagging operation with respect to the extracted first information to determine the at least one achievement.

Each of the extracting and the comparing may be performed by using a machine learning technique.

Each of the extracting and the comparing may be performed by using a natural language processing (NLP) technique.

The method may further include using a Google Knowledge Graph with respect to a result of the determining and a predetermined plurality of information that relates to available jobs to assign a hash value to the first resume.

According to another exemplary embodiment, a computing apparatus for extracting information from a resume of an applicant is provided. The computing apparatus includes a processor, a memory, and a communication interface coupled to each of the processor and the memory. The processor is configured to: receive, via the communication interface, a first resume that relates to a first applicant; extract, from the received first resume, first information that relates to at least one applicant attribute; compare the extracted first information with a predetermined plurality of skills; and determine, based on a result of the comparing, at least one skill that corresponds to the first applicant.

The processor may be further configured to annotate the first resume based on a result of the determining.

The processor may be further configured to compare the extracted first information with a predetermined plurality of job-specific skills and to compare the extracted first information with a predetermined corpus of applicant characteristics that relate to soft skills.

The processor may be further configured to: use a Bidirectional Encoder Representations from Transformers (BERT) model to compare the extracted first information with the predetermined corpus of applicant characteristics; and perform the determining of the at least one skill that corresponds to the first applicant by using a 0.8 cosine similarity threshold with respect to a result of the using of the BERT model.

The processor may be further configured to apply a term frequency/inverse document frequency (TF/IDF) technique to a plurality of previously received resumes in order to determine the predetermined plurality of job-specific skills.

The processor may be further configured to use the extracted first information to determine at least one achievement that relates to the first applicant.

The processor may be further configured to perform a part-of-speech (POS) tagging operation with respect to the extracted first information to determine the at least one achievement.

The processor may be further configured to perform each of the extracting and the comparing by using a machine learning technique.

The processor may be further configured to perform each of the extracting and the comparing by using a natural language processing (NLP) technique.

The processor may be further configured to use a Google Knowledge Graph with respect to a result of the determining and a predetermined plurality of information that relates to available jobs to assign a hash value to the first resume.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
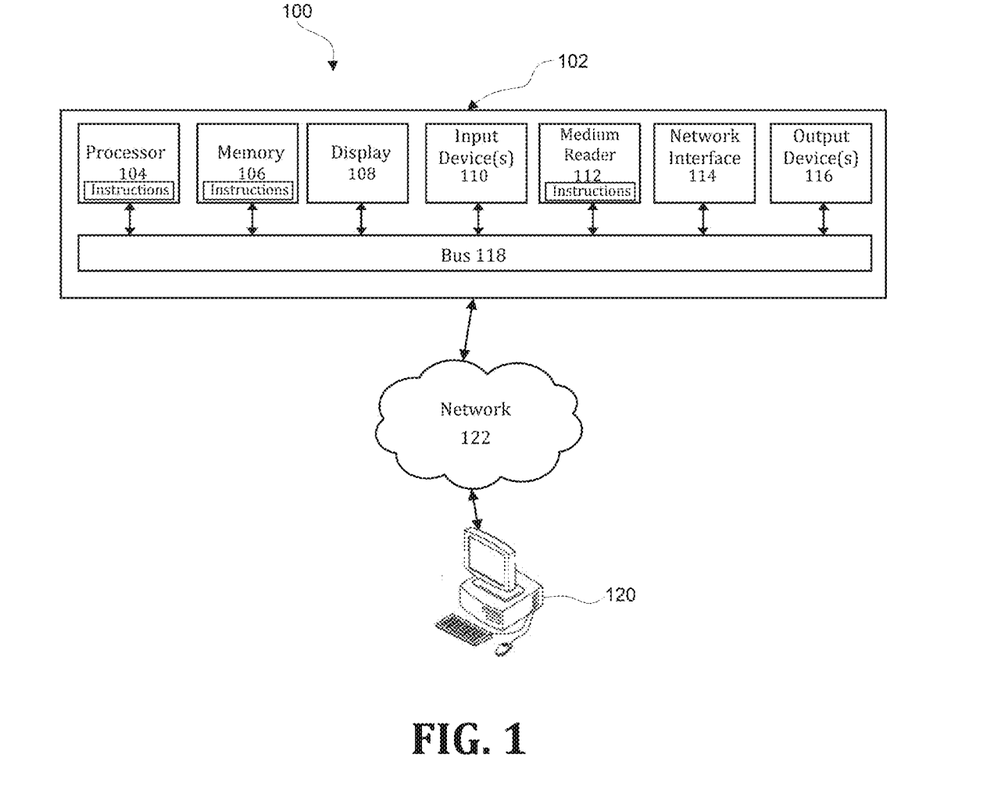
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for extracting information from a resume of an applicant by using deep learning and natural language processing techniques.

Figure 2:
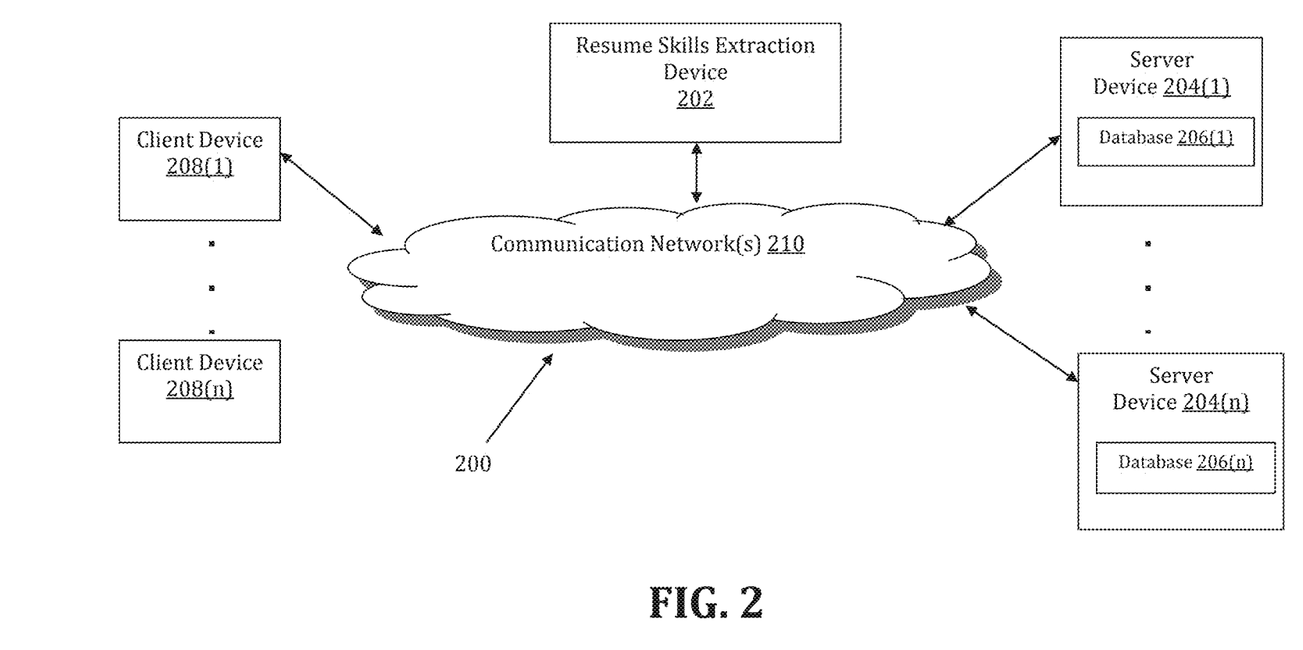
FIG. 2 illustrates an exemplary diagram of a network environment.

Referring to FIG. 2, a schematic of an exemplary network environment 200 for implementing a method for extracting information from a resume of an applicant by using deep learning and natural language processing techniques is illustrated. In an exemplary embodiment, the method is executable on any networked computer platform, such as, for example, a personal computer (PC).

The method for extracting information from a resume of an applicant by using deep learning and natural language processing techniques in a manner that is implementable in various computing platform environments may be implemented by a Resume Skills Extraction (RSE) device 202. The RSE device 202 may be the same or similar to the computer system 102 as described with respect to FIG. 1. The RSE device 202 may store one or more applications that can include executable instructions that, when executed by the RSE device 202, cause the RSE device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the RSE device 202 itself, may be located in virtual server(s) running in a cloud-based computing environment rather than being tied to one or more specific physical network computing devices. Also, the application(s) may be running in one or more virtual machines (VMs) executing on the RSE device 202. Additionally, in one or more embodiments of this technology, virtual machine(s) running on the RSE device 202 may be managed or supervised by a hypervisor.

In the network environment 200 of FIG. 2, the RSE device 202 is coupled to a plurality of server devices 204(1)-204(n) that hosts a plurality of databases 206(1)-206(n), and also to a plurality of client devices 208(1)-208(n) via communication network(s) 210. A communication interface of the RSE device 202, such as the network interface 114 of the computer system 102 of FIG. 1, operatively couples and communicates between the RSE device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the RSE device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and RSEM devices that efficiently implement a method for extracting information from a resume of an applicant by using deep learning and natural language processing techniques.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The RSE device 202 may be a standalone device or integrated with one or more other devices or apparatuses, such as one or more of the server devices 204(1)-204(n), for example. In one particular example, the RSE device 202 may include or be hosted by one of the server devices 204(1)-204(n), and other arrangements are also possible. Moreover, one or more of the devices of the RSE device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the RSE device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to resumes and data that relates to skills.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the RSE device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the RSE device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the RSE device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the RSE device 202, the server devices 204(1)-204(n), or the client devices 208(1)-208(n), for example, may be configured to operate as virtual instances on the same physical machine. In other words, one or more of the RSE device 202, the sever devices 204(1)-204(n), or the client devices 208(1)-208(n) may operate on the same physical device rather than as separate devices communicating through communication network(s) 210. Additionally, there may be more or fewer RSE devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
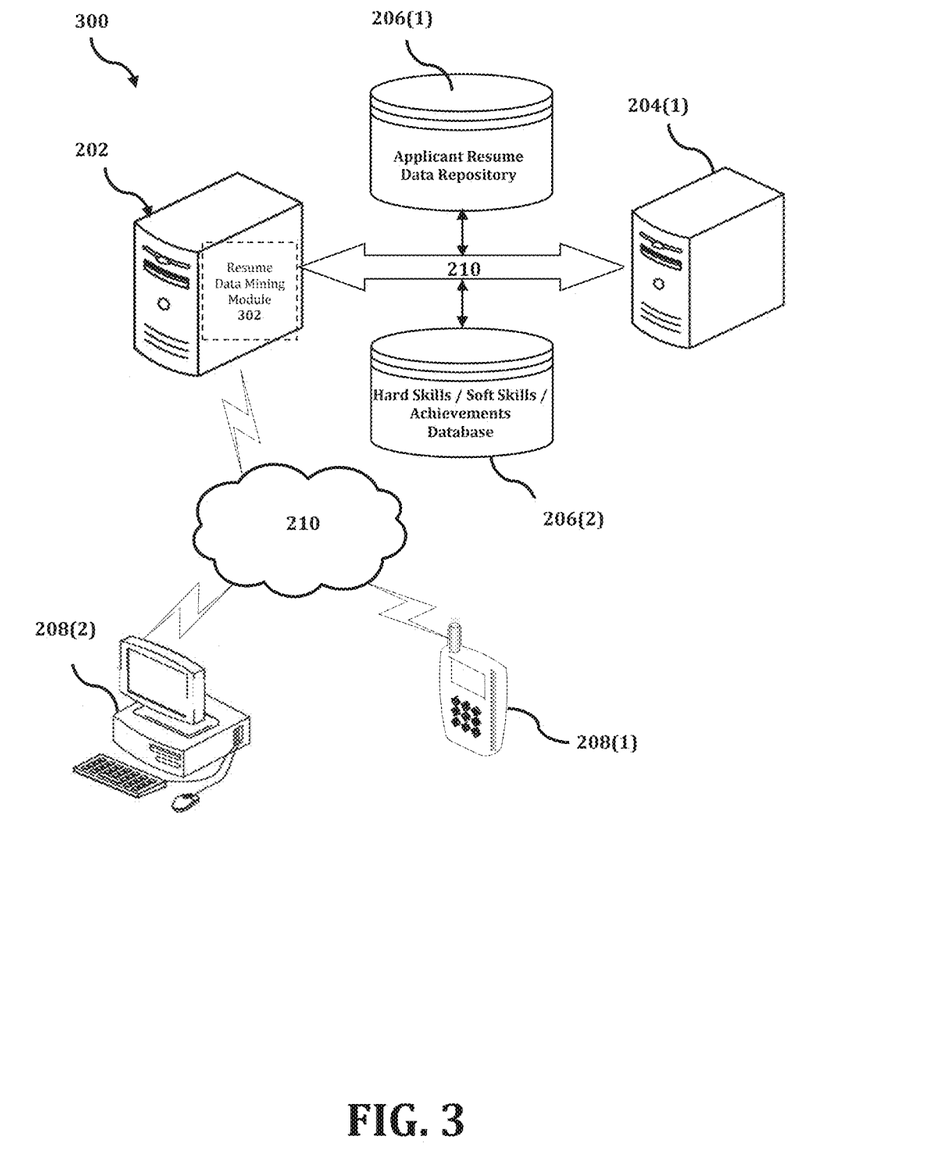
FIG. 3 shows an exemplary system for implementing a method for extracting information from a resume of an applicant by using deep learning and natural language processing techniques.

The RSE device 202 is described and shown in FIG. 3 as including a resume data mining module 302, although it may include other rules, policies, modules, databases, or applications, for example. As will be described below, the resume data mining module 302 is configured to implement a method for extracting information from a resume of an applicant by using deep learning and natural language processing techniques in an automated, efficient, scalable, and reliable manner.

An exemplary process 300 for implementing a method for extracting information from a resume of an applicant by using deep learning and natural language processing techniques by utilizing the network environment of FIG. 2 is shown as being executed in FIG. 3. Specifically, a first client device 208(1) and a second client device 208(2) are illustrated as being in communication with RSE device 202. In this regard, the first client device 208(1) and the second client device 208(2) may be "clients" of the RSE device 202 and are described herein as such. Nevertheless, it is to be known and understood that the first client device 208(1) and/or the second client device 208(2) need not necessarily be "clients" of the RSE device 202, or any entity described in association therewith herein. Any additional or alternative relationship may exist between either or both of the first client device 208(1) and the second client device 208(2) and the RSE device 202, or no relationship may exist.

Further, RSE device 202 is illustrated as being able to access an applicant resume data repository 206(1) and a hard skills/soft skills/achievements database 206(2). The resume data mining module 302 may be configured to access these databases for implementing a method for extracting information from a resume of an applicant by using deep learning and natural language processing techniques.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the RSE device 202 via broadband or cellular communication. Of course, these embodiments are merely exemplary and are not limiting or exhaustive.

Upon being started, the team-based resume matching module 302 executes a process for extracting information from a resume of an applicant by using deep learning and natural language processing techniques. An exemplary process for extracting information from a resume of an applicant by using deep learning and natural language processing techniques is generally indicated at flowchart 400 in FIG. 4.

Figure 4:
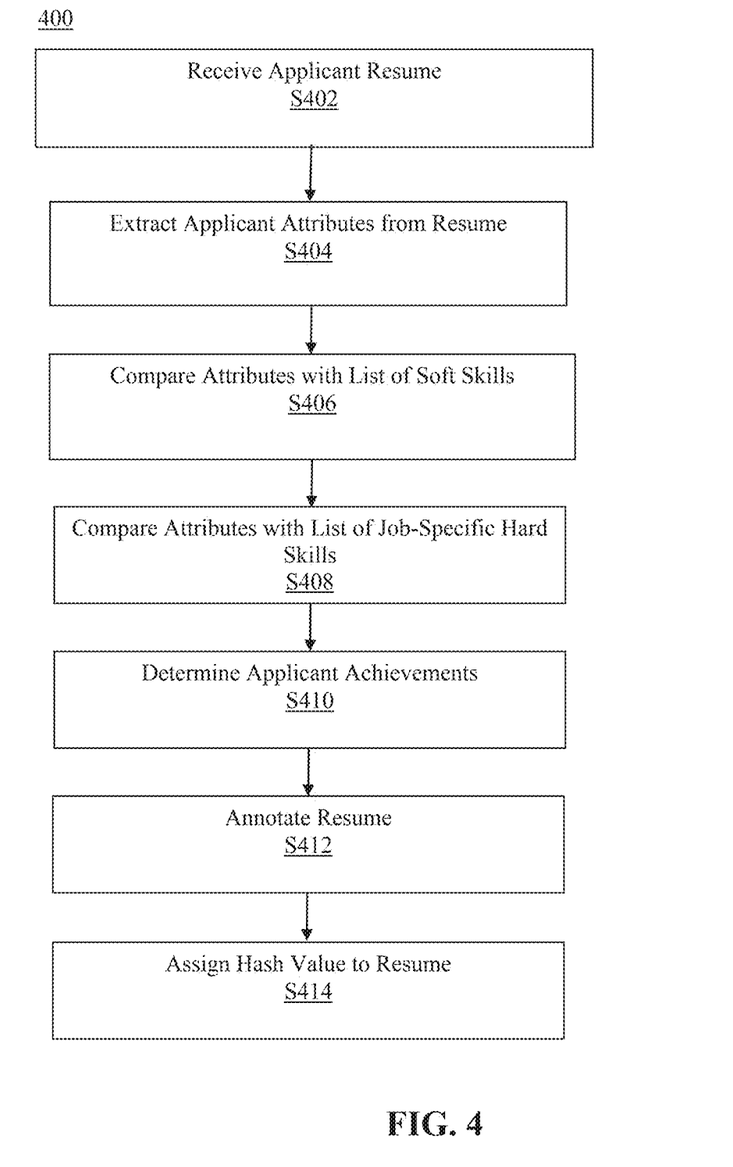
FIG. 4 is a flowchart of an exemplary process for implementing a method for extracting information from a resume of an applicant by using deep learning and natural language processing techniques.

In the process 400 of FIG. 4, at step S402, the resume data mining module 302 receives a resume from an applicant. At step S404, the resume data mining module 302 extracts applicant attributes from the received resume. In an exemplary embodiment, the applicant attributes may include any one or more of an applicant skill, such as a specialized professional skill; an applicant education level, such as a degree that the applicant has attained; a name of a school, college, or university from which the applicant has graduated and/or received a degree; a previous work experience of the applicant; and an applicant qualification, such as, for example, a non-work experience, an award, a publication, and/or an achievement of the applicant. In an exemplary embodiment, the extracting operation is performed by using at least one of a machine learning technique, a deep learning technique, and/or a natural language processing (NLP) technique.

At step S406, the resume data mining module 302 compares the applicant attributes with a list of soft skills in order to determine which soft skills correspond to the applicant. In an exemplary embodiment, the term "soft skill" refers to a characteristic or quality of an applicant that is not specific to a particular job, but instead describes the applicant in a more personal way. For example, the list of soft skills may include one or more of the following: social; courteous; punctual; responsive; professional; efficient; responsible work habits; and properly maintains relationships with customers. In an exemplary embodiment, the list of soft skills may include a predetermined corpus of applicant characteristics, and the comparison of the applicant attributes may be performed by using a Bidirectional Encoder Representations Transformers (BERT) model, and/or a variant thereof, with respect to the extracted attributes and the corpus of applicant characteristics.

At step S408, the resume data mining module 302 compares the applicant attributes with a list of job-specific hard skills in order to determine which hard skills correspond to the applicant. In an exemplary embodiment, the term "hard skill" refers to a skill that is specific to a particular job, and/or may be indicative of having obtained a credential, such as a university degree or a course completion credit. For example, if a particular job relates to investments, the list of hard skills may include financial models; equity research; investment banking; buy side; sell side; private equity; corporate finance; cfa level; research reports; financial analysis; hedge fund; and market research. As another example, if a particular job relates to sales, the list of hard skills may include business development; institutional sales; institutional clients; cross selling; and English Mandarin. In an exemplary embodiment, the list of hard skills may be determined by applying a term frequency/inverse document frequency (TF/IDF) technique to a set of previously received resumes.

At step S410, the resume data mining module 302 determines applicant achievements from the applicant attributes extracted in step S404. In an exemplary embodiment, an applicant achievement refers to an accomplishment, an award, and/or a completed task, and typically includes a past tense verb that indicates the fact that the achievement has been completed. For example, an applicant achievement may include one or more of the following: answered 30 calls per hour; created and managed a team; and responsible for products being shipped to customers accurately and in a timely manner. In an exemplary embodiment, the determination of applicant achievements may include performing a part-of-speech (POS) tagging operation with respect to the extracted applicant attributes.

At step S412, the resume data mining module 302 annotates the resume. In an exemplary embodiment, the annotating may be performed by using relevant items included in the list of soft skills and/or the list of hard skills.

At step S414, the resume data mining module 302 assigns a hash value to the resume. In an exemplary embodiment, the resume data mining module 302 uses Google Knowledge Graph with respect to soft skills and hard skills determined as corresponding to the applicant and with respect to information that relates to available jobs in order to assign a hash value to the resume.

In an exemplary embodiment, an artificial intelligence (AI)-based framework that uses Natural Language Processing (NLP) and Machine Learning at its core to effectively model candidates along multiple dimensions, based on their resumes, is provided. At a high level, the algorithm has the capability to read a large volume of resumes, extract relevant information from the resumes, and normalize the information in such a way that makes it easily accessible, searchable, and retrievable by human users.

Once the algorithm has annotated the resumes, the downstream tasks become exponentially easier for the humans involved in the recruiting process. A highly manual and cumbersome sense-making task boils down to filtration based on tags.

At its heart, this algorithm leverages various techniques from the world of NLP to perform various tasks such as contextual understanding, entity lookup, skill detection and verbiage removal.

Methodology: A resume is a document that reflects the qualifications of a candidate. The document is commonly received in Portable Document Format (PDF) format. Very often, the PDF may be properly formatted (i.e., the text within the document is retrievable by using a library, such as, for example, PDFMiner). In some instances, the document is a flat image, and requires Optical Character Recognition (OCR). Software tools such as Tesseract may be used to process the latter group of resumes.

Such software tools may be employed to process the resume and extract the raw text enclosed in the document. This raw text serves as an input to the algorithms described in the present disclosure. The algorithms work on this raw text to extract and normalize relevant information.

In an exemplary embodiment, processing of resumes may be performed along the following four dimensions: 1) Prior experience of the candidate; 2) soft skills of the candidate; 3) job-specific skills of the candidate, also referred to herein as hard skills of the candidate and/or technical skills of the candidate; and 4) the candidate's capacity to deliver satisfactory results. Because each of these dimensions is independent of the others, the algorithm is able to approach these four problems in tandem. In this aspect, each problem has its own approach to derive optimal results.

Extraction of prior experience: A candidate's prior professional experience reflects on their background, their fit, and their career trajectory. In an exemplary embodiment, the algorithm identifies the previous places of employment for each candidate by using a two-step approach: 1) Extract the candidate's previous employers; and 2) use the Google Knowledge Graph application programming interface (API) to retrieve further information about each employer, such as their industry.

Extracting previous employers: Resumes are often composed of sections, where each section reflects a dimension of the candidate's qualifications, such as, for example, personal information, educational history, professional experience, spoken languages, voluntary work, publications, awards and accolades, and other information that may be deemed relevant. The goal of this component is to identify the section related to professional experience, and to extract the name of each employer from this section.

There are a few challenges to address. First, individual sections might not be easily identifiable. Many resumes are styled and organized in a sophisticated fashion, including multiple columns or a colorful background palette. Once text is extracted from these documents, all stylistic information is stripped from it, and the alignment and spacing information is often lost. In an exemplary embodiment, some software tools, such as both PDFMiner and Tesseract, provide bounding-box information that can be used to reverse-engineer the relative position of each text span in the original resume.

A conventional way of approaching this problem would be to treat it as an Information Extraction problem, and use a traditional Machine Learning model to perform the task. However, traditional Machine Learning models require the curation of a large labeled dataset in order to train the model, which may not always be feasible.

In an exemplary embodiment, an unsupervised approach that makes use of various heuristics about how resumes are organized is provided. Concretely, for any given line extracted from the resume, the algorithm inspects the following questions: 1) Whether a line has been visited that is likely to be the header for the experience section. Common headers include "Experience", "Professional Experience", "Prior Experience", "Employment History", etc. 2) Whether the current line has a named entity mentioned in it (named entities may be extracted by using an extraction tool, such as, for example, the spaCy library). 3) Whether the current line includes a common business entity designation, such as, for example, "LLC", "Inc.", "Corp.", etc. 4) Whether any of the current, previous, or next lines include an expression that reflects a time period, such as, for example, "2019-Present". 5) Whether any of the current, previous, or next lines include an expression that reflects a location, such as, for example, "London" or "IL". 6) Whether the current line includes an expression that refers to an organization.

Each of the above items is referred to below as a "feature". In order to accurately extract the above features, the system represents each line as a 300-dimensional vector of numbers. For example, the spaCy library provides such representations for each word, using the GloVe method. To represent an entire line, the individual representations for each word are averaged together. Once these representations are created for each line, features 1-6 are extracted, using the methods described in Table 1 below:

TABLE 1

How features are extracted from each given line in a resume

| # | Feature | Method |
|---|---------|--------|
| 1 | Whether a line has been visited that is likely to be the header for the experience section. | Let $w_j$ represent a list of keywords signifying job experience such as 'employment', 'work' and 'experience', and $w_{\sim j}$ represent a list of keywords related to other sections of a resume such as 'education' and 'skills'. Then, if $l_j$ is the ith line in the resume, this feature is represented as: $$\sum_{k=1}^{i-1}[\max(ls(v_{l_k}, w_j)) - \max(ls(v_{l_k}, w_{\sim j}))] * (1-\epsilon)^{i-k}$$ where $ld(x, y)$ represents the Levenshtein similarity of x and y and $\max(ls(x, Y))$ represents the maximum Levenshtein similarity between a word x and the elements of the array Y. Simply put, for each line, the difference between the similarity of the line to job-related headers and the non-job-related headers is calculated. The last term is an exponential decay factor, ensuring that once a relevant header is visited, the farther the algorithm moves from it, the less reliance will be placed on it. $\epsilon$ may be tuned by using a validation exercise described below. |
| 2 | Whether the current line has a named entity mentioned in it. | Named entities are extracted by using an extraction tool, such as, for example, the spaCy library, and this feature is simply a count of the number of named entities identified in the current line. |
| 3 | Whether the current line includes a common business entity designation. | A list of common legal entity types may be compiled by using, for example, the cleanco taxonomy. This feature is represented as a boolean indicating whether at least one such entity type is expressed in the given line. |
| 4 | Whether any of the current, previous, or next lines include an expression that reflects a time period. | All expressions of time periods within each line are tagged by using, for example, the spaCy library. This feature is represented as a boolean indicating whether at least one such expression exists in the current, previous or next line. |
| 5 | Whether the current, previous, or next lines include an expression of location. | All expressions of location within each line are tagged by using, for example, the spaCy library. This feature is represented as a boolean indicating whether at least one such expression exists in the current, previous or next line. |
| 6 | Whether the current line includes an expression that is likely to refer to an organization. | All expressions within each line are tagged by using, for example, the spaCy library. This feature is represented as a boolean indicating whether at least one such expression exists in the current line. |

Once the above features are extracted from each line, a decision tree is used to identify lines that include places of employment and to distinguish lines that do not include places of employment. In an exemplary embodiment, the decision tree has been validated on a set of 100 resumes which had been processed to extract each line, and where each line has been manually labeled to identify whether a place of employment had been mentioned. The following rules and parameters yield maximum performance:

If Feature1>0 AND Feature2>0 AND (Feature3 OR Feature4 OR Feature5 OR Feature6)⇒yield Tre

∈=0.1

Using the Google Knowledge Graph to retrieve more information: Once relevant lines are identified, the Google Knowledge Graph may be used to further refine the extracted information. The Knowledge Graph is available to end-users via APIs that are usable for extracting information about various entities such as people, locations, organizations, and businesses. Given a search term such as "BoFA", the Knowledge Graph can resolve the search term to the proper entity and provide additional information, such as official name (e.g., "Bank of America"), type (e.g., "Corporation"), description (e.g., "Financial services company"), etc.

Each line in the resume that is flagged as potentially including a place of employment is searched against the Google Knowledge Graph via its public APIs. If the Knowledge Graph responds with the appropriate type (i.e., Corporation or Organization), the line is flagged as a proper entity, and relevant information, such as formal name and description, are stored together with the raw expression of the entity as it appears on the resume. Table 2 displays examples of such entities:

Table 2. Example entities and additional information provided by the Google Knowledge Graph.

| Expression in the resume | Google Knowledge Graph response | |
| --- | --- | --- |
| | Official name | Description |
| BoFA | Bank of America | Financial services company |
| McDonalds | McDonald's | Fast food company |
| Meijer Grocery Stores | Meijer | Supermarket company |

Extraction of soft skills: Soft skills form an essential part of any resume and various roles and job positions require a specific set of soft skills. One of the most interesting points on soft skill extraction is the fact that unlike other resume artifacts, soft skills are usually inferred. This immediately excludes any string extraction approach. For example: 1) "Always on time to work and performs actions with great care" may be interpreted as being equivalent to the soft skill "Responsible work ethic". 2) "A very effective communicator with great command over the English language" may be interpreted as being equivalent to the soft skill "Communication skills".

As may be seen from the above examples, the algorithm uses contextual inference, as opposed to mere phrase extraction. To achieve this, recent developments in the field of Natural Language Processing, specifically—Deep Learning are relied upon. In an exemplary embodiment, the Sentence-BERT model, which is an improvement to the earlier BERT model, is employed by the algorithm. While the latter provides rich representations that capture context for words, the former is able to provide representations optimized for the task of sentence similarity. As a consequence, this model generates similar representations for similar sentences. In this context, a "representation" is expressed as an array of numbers, and in a mathematical sense, a "representation" is a vector.

Another objective is to assign relevant tags using these representations. It might seem infeasible to condense such freely formatted sentences into arbitrary length soft skill tags. However, this may be achieved by using a standard set of soft skills that have been used in other research publications.

Thus, in an exemplary embodiment, the algorithm relies on a model that can identify similar sentences and a taxonomy of soft skills, and is designed to perform the following concrete steps: 1) Read a textualized version of a resume. Various software modules are useful for the conversion of PDF and word documents to text documents. 2) Once the data has been read, preprocess the data by removing any non-ASCII characters, extra spaces, digits, and punctuation symbols. Upon doing so, extract each line in the phrase by splitting on a new line character, tab character and a return character. 3) Read the list of soft skills. 4) Instantiate the deep learning model and compute and store the representation from the deep learning model for every sentence in the resume. Similarly compute and store the representation for each skill from the model. 5) For every sentence, compute the cosine distance with every skill. If the cosine distance is lesser than 0.2, and the sentence length is greater than three characters (as a sanity check), then the corresponding soft skill is tagged to that sentence.

The following is a mathematical formulation of steps 4 and 5 above:

$\forall s_i \in S$ where S represents the set of all sentences in a resume r

Compute $m_i = B(s_i)$ where B represents the S-BERT model and $m_i$ is the representation of $s_i$ Let M be the set of all representations $\forall s_i \in S$ Similarly $\forall k_i \in K$ (where K represent the set of all soft skills)

Compute $n_i = B(k_i)$

Let N be the set of all soft skill representations $\forall k_i \in K$

Construct the distance matrix $D_{ij} = d(m_i, n_j)$ where d represents the cosine distance $\forall D_{ij} < 0.2$ where $len(s_i) > 3$, we tag soft skill $k_j$ for sentence $s_i$ Here $s_i$ is the sentence that generated the representation $m_i$ and $k_j$ is the soft skill that generated the representation $n_j$ Extraction of hard/technical skills: Unlike soft skills, hard skills present a different challenge. Although contextual appearance of phrases is less important, in an exemplary embodiment, the algorithm mines a wide variety of job-specific hard skills. For example, in the field of investment banking, hard skills may include Excel, Fixed Income Securities, Mortgage backed securities, etc. As another example, in the field of computer science, hard skills may include Python, Matlab, and Partial Differential Equations.

A complexity in this task is that the list of hard skills changes with time, and no amount of enumeration will suit the task. Thus, it is important to identify a method by which job-specific hard skills can be learned and identified in incoming resumes.

Potential use cases: An interesting point to note about job-specific hard skills is that only skills that exclusively occur in one area of work are relevant. As a consequence, this aspect of the algorithm may be used in two distinct ways as follows: 1) Hard Skill tagging: Once a list of hard skills is established for each job category, these skills can be tagged in an input resume. This will, however, be conditioned on whichever job category the candidate is applying for. For example: When a candidate X applies to a Corporate Secretary position, the algorithm scans and highlights the relevant skills that have been "learned" by the algorithm as being related to this category. 2) Resume Category inference: Given the fact that the algorithm learns hard skills that will exclusively occur in one category of applications, the algorithm may now infer the optimal job category for a resume.

Learning Job-Specific hard skills: The term "learning" almost readily implies that a cohort of some kind is used to extract these skills. In an exemplary embodiment, the cohort may include a public dataset of resumes belonging to various categories.

The mining of hard skills may be understood as analogous to extracting specific keywords for each category of resumes. For this task, a text vectorization method known as Term Frequency-Inverse Document Frequency (TF-IDF) is used. This is a very popular vectorization method that weights highly the terms that exclusively occur in one document. Thus, in an exemplary embodiment, the algorithm executes the following concrete steps: 1) Read resumes from the aforementioned public dataset of resumes and organize them into each category. Upon reading, also clean the resumes of any non-ASCII characters, stray spaces and digits. 2) Once this has been done, concatenate resumes of each category into a single large text document. As a result, there is now one document for each category of resumes. 3) These documents (i.e., one document for each category of resumes) are passed through a TF-IDF vectorizer. In an exemplary embodiment, the algorithm captures pairs of words (i.e., bigrams) as well as single words (i.e., unigrams), and in this aspect, the vectorizer extracts bigrams in addition to unigrams. Further, in an exemplary embodiment, the vectorizer is a character level TF-IDF vectorizer. The reason for this is to allow for accommodating words that have not previously been seen in a new resume, and this character level vectorization will facilitate achieving partial similarity. For example, the term "Basic" may be interpreted as being similar to "Visual Basic".

4) Once the weights for the TF-IDF weight matrix have been obtained, each category document is passed through the vectorizer, and a descending sort of the unigrams and bigrams based on their TF-IDF weights is performed. In an exemplary embodiment, the first fifty (50) such sorted unigrams and bigrams are extracted as job-specific technical skills for that category. 5) As a means of post processing, it is important to weed out any unnecessary information that might be present. For example, if the category document contains all resumes for Hong Kong and there are no other resumes from Hong Kong in the other categories, Hong Kong would show up as a job-specific hard skill. Owing to this situation, it is important to clean up the results and ensure that such noisy values do not seep in.

Mathematically, the above steps may be described as follows:

Given a list of categories of jobs $C=\{C_1, C_2, C_3, \ldots, C_n\}$
And for each category $C_i$ let $R_i$ represent the set of resumes belonging to that category
Now, the set of all resumes is $R=\{R_1, R_2, R_3, \ldots, R_n\}$
(Assuming that every resume is associated with exactly 1 category)
Let F be a function that concatenates all resumes in $R_i$
Let $R'=\{R'_1, R'_2, R'_3, \ldots, R'_n\}$ where $R'_i=F(R_i)$
We now train the TF-IDF vectorizer with all the n documents in R'
The top 50 features with largest weights for each $R'_i$ are designated as category $C'_i$s job specific hard skills
Identification of delivery language: Identification of delivery language heavily relies upon sentence structure and part-of-speech (POS) tags. The main purpose of this aspect of the algorithm is to reduce the verbiage in resumes by identifying only those phrases that indicate what the candidate has achieved or done. Therefore, in an exemplary embodiment, the algorithm uses the spaCy library to assign POS tags to every sentence, and then uses regular expressions to filter our phrases that follow the following POS tag rule: <VERB>+<ADV>*<ADJ>*<NOUN>+ This assists in identifying any phrase that begins with one or more verbs, followed by zero or more adjectives, zero or more adverbs, and one or more nouns in the end.

User Interface: In an exemplary embodiment, a user may utilize the algorithm in two modes via a user interface (UI). In the first mode, the user can upload a resume and compare it with previously processed resumes. Once uploaded, soft and hard skills are extracted from the resume and compared against previously processed resumes.

Figure 5:
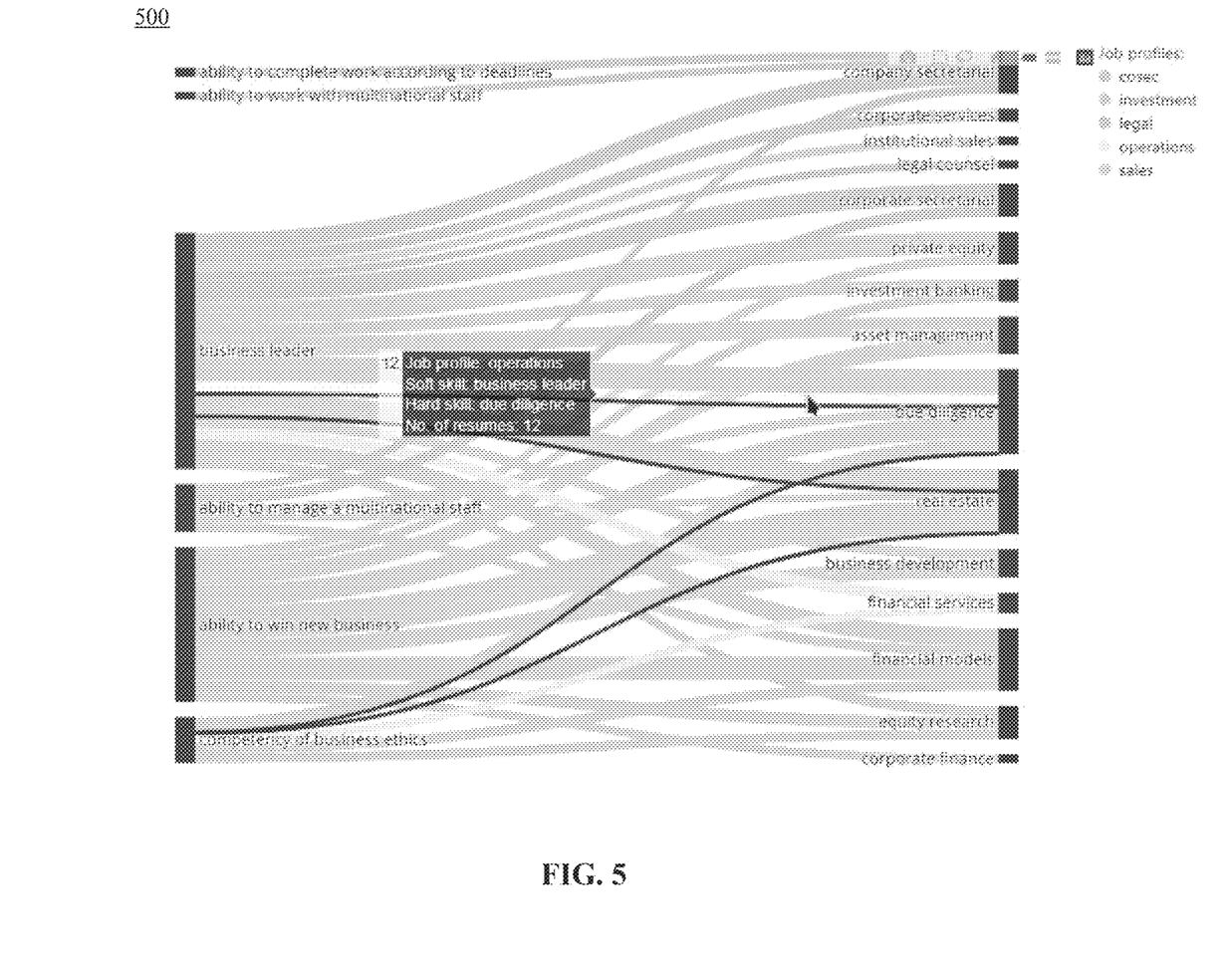
FIG. 5 is a Sankey chart that graphically depicts a first output of an algorithm that implements a method for extracting information from a resume of an applicant by using deep learning and natural language processing techniques, according to an exemplary embodiment.

Referring to FIG. 5, a Sankey chart 500 may be used to display the results to the end user. In the Sankey chart 500, the left y-axis represents soft skills such as "business leader" and "ability to manage a multinational staff". The right y-axis represents hard skills such as "legal counsel" and "private equity". Each beam in the Sankey chart 500 connects a soft skill to a hard skill. The thickness of the beam represents the number of pre-processed resumes that include the corresponding soft and hard skills. In an exemplary embodiment, the beams may be color-coded to represent the job-profile of those resumes.

As an example, in the Sankey chart 500, one such beam has been highlighted. The highlighted beam shows that in 12 previously-processed resumes, business leadership was co-mentioned with due diligence. Those 12 resumes were in the "operations" job profile.

Figure 6:
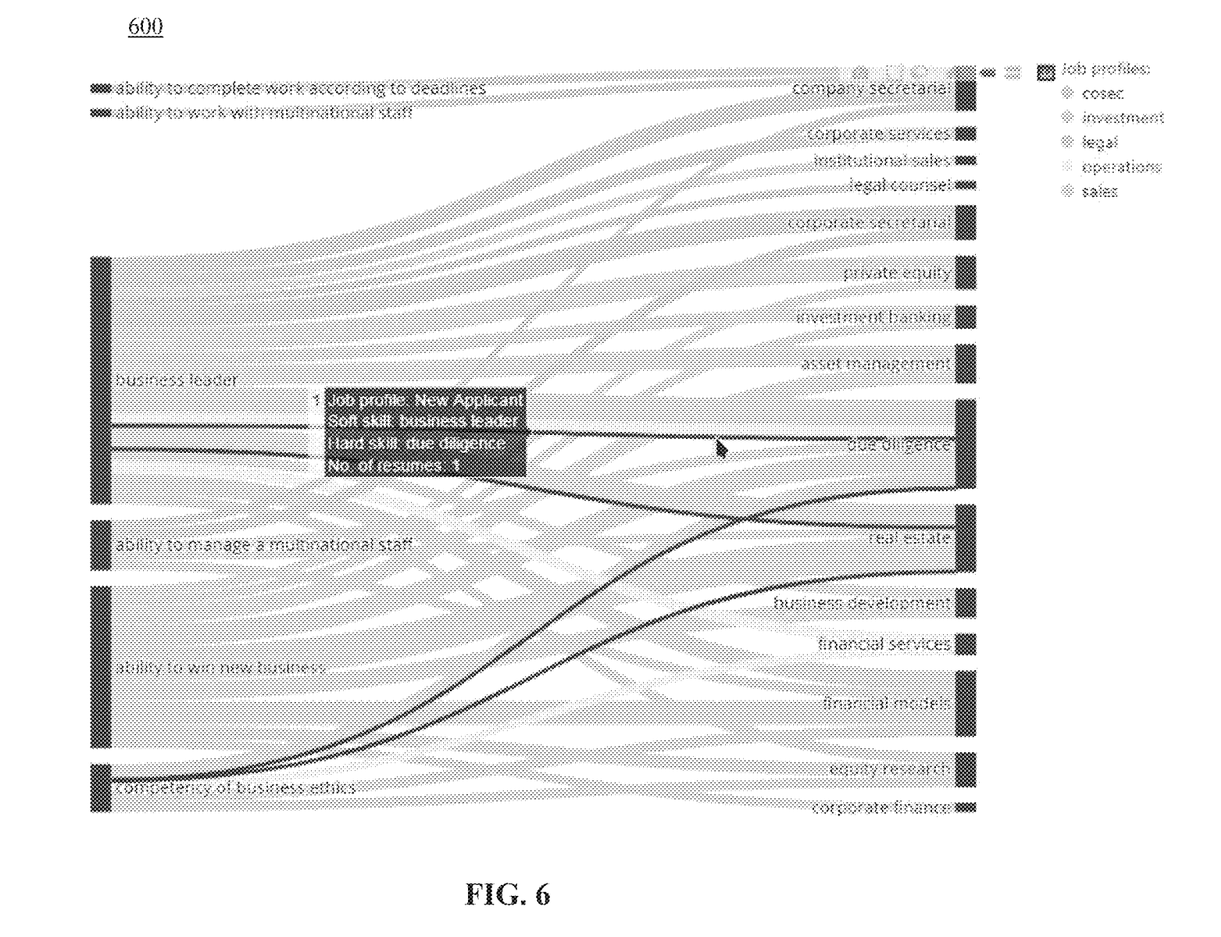
FIG. 6 is a Sankey chart that graphically depicts a second output of an algorithm that implements a method for extracting information from a resume of an applicant by using deep learning and natural language processing techniques, according to an exemplary embodiment.

Referring to FIG. 6, information extracted from the newly uploaded resume is highlighted in the Sankey chart 600. The selected beam shows that the newly uploaded resume co-mentions business leadership and due diligence. This is similar to the 12 resumes in the operations job category as illustrated in the Sankey chart 500, which is why the beam appears next to them.

Such visualizations help users quickly identify the set of skills mentioned in any given resume and visually place them in the universe of previously processed resumes. As an example, based on the information displayed on the UI, the user might decide that the newly uploaded resume has some similarities to operations roles as well as sales roles. Since the targeted end users are recruiters and human resources (HR) personnel, this helps them in the vetting process as well as the placement process.

This can also help recruiters improve their recruitment strategy over time. As an example, the UI may provide an analytical view that displays the previous places of employment for resumes submitted to a specific job role, including information that relates to individual employers and/or industries and sectors that have been the most common in previously processed resumes. In an exemplary embodiment, the analytical view may allow recruiters to adjust their strategy, diagnose potential biases or refine job descriptions to encourage diversity.

In the second mode, the user can search the universe of previously uploaded resumes for certain experiences, skills, or deliverables. For example, if a user searches for "investment management", the user interface may display a list of previously processed resumes which include investment management companies in the experience section, or list related fields such as asset management under hard skills.

Accordingly, with this technology, an optimized process for extracting information from a resume of an applicant by using deep learning and natural language processing techniques is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for extracting information from a resume of an applicant, the method being implemented by at least one processor, the method comprising:

receiving, by the at least one processor, a first resume that relates to a first applicant;

using, by the at least one processor, Natural Language Processing (NLP) and machine learning that implements an algorithm for:

extracting, from the received first resume, first information that relates to at least one applicant attribute, wherein the extracting includes transforming each respective line of the resume into a multi-dimensional vector of numbers, wherein each multi-dimensional vector of numbers is generated by averaging each individual representation for each respective word from the respective line;

performing, by the at least one processor and based on each respective multi-dimensional vector of numbers, a first analysis to identify at least one prior experience from the extracted first information by using the NLP and the machine learning to identify at least one previous employer of the first applicant from the first resume, wherein the first analysis comprises:

determining whether a each respective line within the first resume is likely to be a header for an experience section by calculating a difference between a similarity of each respective line to job-related headers and to non-job-related headers;

determining whether the respective line refers to an entity name;

determining whether the respective line refers to a business entity designation;

determining whether the respective line or an adjacent line to the respective line refers to at least one from among a time period and a location; and identifying, via a decision tree, whether each respective line includes a place of employment based on a result of the determining of whether each respective line within the first resume is likely to be a header for an experience section, a result of the determining of whether the respective line refers to an entity name, a result of the determining of whether the respective line refers to a business entity designation, and a result of the determining of whether the respective line or an adjacent line to the respective line refers to at least one from among a time period and a location;

performing, by the at least one processor via a sentence-Bidirectional Encoder Representations from Transformers (sentence-BERT) model, a second analysis to identify at least one soft skill from the extracted first information by using the NLP and the machine learning to perform contextual inference on the extracted first information by generating numerical representations of each sentence within the resume and comparing to a predetermined list of numerical representations to identify the at least one soft skill from the first resume, wherein the at least one soft skill describes a personal attribute of the applicant;

performing, by the at least one processor via a term frequency/inverse document frequency (TF/IDF) technique, a third analysis to identify at least one job-specific skill from the extracted first information by using the NLP and the machine learning to learn a list of skills from a plurality of previously received resumes, comparing the extracted first information with the list of skills, and determining, based on a result of the comparing, the at least one job-specific skill that corresponds to the first applicant; and assigning, by the at least one processor via a knowledge graph, a hash value to the resume based on the determined at least one job-specific skill and the identified at least one soft skill.

2. The method of claim 1, further comprising annotating the first resume based on a result of the determining.

3. The method of claim 1, wherein:
the identifying of the at least one soft skill that corresponds to the first applicant comprises using a 0.8 cosine similarity threshold with respect to a result of the performing of the second analysis.

4. The method of claim 1, further comprising performing, using the extracted first information, a fourth analysis to determine at least one achievement that relates to the first applicant, wherein the at least one achievement comprises at least one from among an award and a completion of a job-specific task.

5. The method of claim 4, wherein the using of the extracted first information to determine at least one achievement that relates to the first applicant comprises performing a part-of-speech (POS) tagging operation with respect to the extracted first information to determine the at least one achievement.

6. The method of claim 4, further comprising:
performing a fifth analysis to predict the applicant's capacity to perform a job based on the extracted first information.

7. The method of claim 1, further comprising:
using the knowledge graph to generate background information regarding the identified at least one previous employer, wherein the background information includes an industry identification of the at least one previous employer, and wherein each respective line that is identified as including a place of employment is searched against the knowledge graph to identify a proper entity name and list the generated background information.

8. A computing apparatus for extracting information from a resume of an applicant, the computing apparatus comprising:
a processor;
a memory; and
a communication interface coupled to each of the processor and the memory,
wherein the processor is configured to:
receive, via the communication interface, a first resume that relates to a first applicant;
use an artificial intelligence (AI) based framework that uses Natural Language Processing (NLP) and machine learning that implements an algorithm to:
extract, from the received first resume, first information that relates to at least one applicant attribute, wherein the extracting includes transforming each respective line of the resume into a multi-dimensional vector of numbers, wherein each multi-dimensional vector of numbers is generated by averaging each individual representation for each respective word from the respective line;
perform, based on each respective multi-dimensional vector of numbers, a first analysis to identify at least one prior experience from the extracted first information by using the NLP and the machine learning to identify at least one previous employer of the first applicant from the first resume, wherein the first analysis comprises:
determining whether each respective line within the first resume is likely to be a header for an experience section by calculating a difference between a similarity of each respective line to job-related headers and to non-job-related headers;
determining whether the respective line refers to an entity name;
determining whether the respective line refers to a business entity designation;
determining whether the respective line or an adjacent line to the respective line refers to at least one from among a time period and a location; and identifying, via a decision tree, whether each respective line includes a place of employment based on a result of the determining of whether each respective line within the first resume is likely to be a header for an experience section, a result of the determining of whether the respective line refers to an entity name, a result of the determining of whether the respective line refers to a business entity designation, and a result of the determining of whether the respective line or an adjacent line to the respective line refers to at least one from among a time period and a location;

perform, via a sentence-Bidirectional Encoder Representations from Transformers (sentence-BERT) model, a second analysis to identify at least one soft skill from the extracted first information by using the NLP and the machine learning to perform contextual inference on the extracted first information by generating numerical representations of each sentence within the resume and comparing to a predetermined list of numerical representations to identify the at least one soft skill from the first resume, wherein the at least one soft skill describes a personal attribute of the applicant;

perform, via a term frequency/inverse document frequency (TF/IDF) technique, a third analysis to identify at least one job-specific skill from the extracted first information by using the NLP and the machine learning to learn a list of skills from a plurality of previously received resumes, compare the extracted first information with the list of skills, and determine, based on a result of the comparing, the at least one job-specific skill that corresponds to the first applicant; and assign, via a knowledge graph, a hash value to the resume based on the determined at least one job-specific skill and the identified at least one soft skill.

9. The computing apparatus of claim 8, wherein the processor is further configured to annotate the first resume based on a result of the determining.

10. The computing apparatus of claim 8, wherein the processor is further configured to:
perform the identifying of the at least one soft skill that corresponds to the first applicant by using a 0.8 cosine similarity threshold with respect to a result of the performing of the second analysis.

11. The computing apparatus of claim 8, wherein the processor is further configured to perform, using the extracted first information, a fourth analysis to determine at least one achievement that relates to the first applicant, wherein the at least one achievement comprises at least one from among an award and a completion of a job-specific task.

12. The computing apparatus of claim 11, wherein the processor is further configured to perform a part-of-speech (POS) tagging operation with respect to the extracted first information to determine the at least one achievement.

13. The computing apparatus of claim 11, further comprising:
performing a fifth analysis to predict the applicant's capacity to perform a job based on the extracted first information.

14. The computing apparatus of claim 8, wherein the processor is further configured to use the knowledge graph to generate background information regarding the identified at least one previous employer, wherein the background information includes an industry identification of the at least one previous employer, and wherein each respective line that is identified as including a place of employment is searched against the knowledge graph to identify a proper entity name and list the generated background information.

* * * * *